(12) United States Patent
Carr

(10) Patent No.: US 10,237,216 B2
(45) Date of Patent: *Mar. 19, 2019

(54) METHOD AND SYSTEM OF OBTAINING CONTACT INFORMATION FOR A PERSON OR AN ENTITY

(71) Applicant: Swisscom AG, Bern (CH)

(72) Inventor: Tim Carr, Effretikon (CH)

(73) Assignee: SWISSCOM AG, Bern (CH)

( * ) Notice: Subject to any disclaimer, the term of this patent is extended or adjusted under 35 U.S.C. 154(b) by 41 days.

This patent is subject to a terminal disclaimer.

(21) Appl. No.: 15/425,643

(22) Filed: Feb. 6, 2017

(65) Prior Publication Data

US 2017/0244654 A1  Aug. 24, 2017

Related U.S. Application Data

(63) Continuation of application No. 14/874,964, filed on Oct. 5, 2015, now Pat. No. 9,565,144, which is a (Continued)

(30) Foreign Application Priority Data

Oct. 26, 2011 (EP) .................................... 11186621

(51) Int. Cl.
*H04L 12/58* (2006.01)
*G06Q 10/10* (2012.01)
(Continued)

(52) U.S. Cl.
CPC .......... *H04L 51/043* (2013.01); *G06F 17/278* (2013.01); *G06K 9/18* (2013.01);
(Continued)

(58) Field of Classification Search
CPC ..... H04L 51/043; H04L 67/24; G06Q 10/107; G06F 17/278; G06K 9/18; G06K 9/46
(Continued)

(56) References Cited

U.S. PATENT DOCUMENTS 7,525,951 B2   4/2009  Musil et al.
7,631,266 B2  12/2009  Werndorfer et al.
(Continued)

FOREIGN PATENT DOCUMENTS

JP    2004527833    9/2004
WO      02073886    9/2002

OTHER PUBLICATIONS

European Patent Office Communication in EP 11186621.6, dated Dec. 18, 2017, 8 pages.

(Continued)

*Primary Examiner* — Daniel G Mariam
(74) *Attorney, Agent, or Firm* — McAndrews, Held & Malloy, Ltd.

(57) ABSTRACT

Methods and systems are provided for obtaining status information associated with a person or an entity and performing actions based on the status information. An indication of the person or the entity may be detected in an output of an electronic device, and status information associated with the person or the entity may be determined, with the status information comprising an indication of accessibility of the person or the entity. The status information may be provided to a user via the electronic device, and based on user input that is responsive to providing the status information, one or more actions relating to the person or the entity may be performed. The one or more actions may comprise initiating in response to the user input and based on the status information, a communication session, to provide connectivity with the person or the entity.

18 Claims, 2 Drawing Sheets

Related U.S. Application Data continuation of application No. 14/628,907, filed on Feb. 23, 2015, now Pat. No. 9,152,621, which is a continuation of application No. 13/649,407, filed on Oct. 11, 2012, now Pat. No. 8,995,769.

(51) Int. Cl.
  *G06F 17/27* (2006.01)
  *G06K 9/18* (2006.01)
  *G06K 9/46* (2006.01)
  *H04L 29/08* (2006.01)

(52) U.S. Cl.
  CPC ............ *G06K 9/46* (2013.01); *G06Q 10/107* (2013.01); *H04L 67/24* (2013.01)

(58) Field of Classification Search
  USPC .......... 382/103, 115, 181, 305; 709/204–207
  See application file for complete search history.

(56) References Cited

U.S. PATENT DOCUMENTS

| | | | |
|---|---|---|---|
| 7,814,438 | B2 | 10/2010 | Grossman et al. |
| 7,912,903 | B2 | 3/2011 | Shah |
| 8,132,110 | B1 | 3/2012 | Appelman et al. |
| 8,838,684 | B2 * | 9/2014 | Biehl ................... G06Q 10/06 370/395.2 |
| 2007/0043731 | A1 | 2/2007 | Wu et al. |
| 2007/0260730 | A1 | 11/2007 | Gadwale |
| 2008/0071868 | A1 | 3/2008 | Arenburg et al. |
| 2008/0086700 | A1 | 4/2008 | Rodriguez et al. |
| 2008/0183814 | A1 | 7/2008 | Sanghavi |
| 2010/0064014 | A1 | 3/2010 | McLaughlin |
| 2010/0105358 | A1 | 4/2010 | Imashimizu et al. |
| 2011/0125735 | A1 | 5/2011 | Petrou |
| 2011/0231507 | A1 | 9/2011 | Appelman |
| 2012/0054288 | A1 | 3/2012 | Wiese et al. |
| 2012/0297321 | A1 | 11/2012 | Douglas et al. |

OTHER PUBLICATIONS

Kohda, et al. (IMPP: A New Instant Messaging Standard and Its Impact on Internet Business), Fujitsu Sci. Tech, J., 36,2, pp. 147-153 Dec. 2000.

European Patent Office Communication with Extended European Search Report, Application No. 11186621.6, dated May 9, 2012. (7 pages).

\* cited by examiner

1 presented by

MANUEL DAMSOHN

Dipl.-Ing. Technische University Clausthal born July 16, 1980 in Esslingen a.N. (Germany)
citizen of Federal Republic of Germany Accepted on the recommendation of Prof. Dr. Horst-Michael Prasser (ETH Zurich), examiner
Prof. Dr.-Ing. Eckard Laurien (University of Stuttgart), co-examiner Zurich, 2011

Fig. 1

1 presented by

MANUEL DAMSOHN

Dipl.-Ing. Technische University Clausthal born July 16, 1980 in Esslingen a.N. (Germany)
citizen of Federal Republic of Germany Accepted on the recommendation of

Prof.  Horst-Michael Prasser (ETH Zurich), examiner
Prof. Dr.-Ing. Eckard Laurien (University of Stuttgart), co-examiner

2

Zurich, 2011

Fig. 2

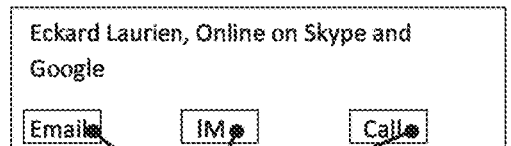

METHOD AND SYSTEM OF OBTAINING CONTACT INFORMATION FOR A PERSON OR AN ENTITY

CLAIM OF PRIORITY AND CROSS-REFERENCE TO RELATED APPLICATIONS/INCORPORATION BY REFERENCE

This patent application is a continuation of U.S. patent application Ser. No. 14/874,964, filed on Oct. 5, 2015, which is a continuation of U.S. patent application Ser. No. 14/628,907, filed on Feb. 23, 2015, which is a continuation of U.S. patent application Ser. No. 13/649,407, filed on Oct. 11, 2012, which in turn claims, pursuant to 35 U.S.C. § 119, the filing date benefit of and right of priority to European (EP) Patent Application Serial No. 11186621.6, filed on Oct. 26, 2011.

Each of the above identified applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

The present invention concerns a method and system of obtaining contact information for a person or an entity.

BACKGROUND OF THE INVENTION

Network applications are known in the prior art that provide access to an online network and having a number of users currently connected to said online network. The status of each user is shown on the computer of a user, so it is possible to see if and how one of the other users can be contacted. As an example, they can be contacted by a VoIP-call, an Instant Message, and via Email. Sometimes, the online status and/or location of the connected user are shown. As an example for such network applications MSN/Messenger network, AIM/Yahoo, Gchat/Google, WhatsApp, Facebook, Skype, Cisco and others can be cited. Currently, a user must load these applications into his personal device, start these applications and enter names into it to see if someone's online, what their status is, how they can be contacted, etc. Furthermore, additional software like Pidgin or Trillian can be loaded, which show the presence in a variety of different applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for obtaining contact information for a person or an entity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the invention will become apparent from the following description of non-limiting exemplary embodiments, with reference to the appended drawings, in which:

FIG. 1 illustrates an exemplary screenshot of a user's device.

FIG. 2 illustrates an exemplary screenshot, where different names have been recognized and marked, in accordance with an exemplary embodiment of the invention.

FIG. 3 illustrates an exemplary contact card of a recognized person with the possibility of contacting the person via email, Instant messenger or call.

FIG. 4 illustrates an exemplary list of all recognized names on a user's screen, including the presence in online networks applications.

FIG. 5 illustrates an exemplary contact card of a recognized person, where different persons with the same name have been found on the Internet.

DETAILED DESCRIPTION OF THE INVENTION

Certain embodiments of the present invention may be found in a method and system for obtaining contact information for a person or an entity, as described in the following in more detail with reference to the attached figures.

As utilized herein, the term "exemplary" means serving as a non-limiting example, instance, or illustration.

Aspects of the present invention enable presence and status control, and control of how a person that is connected to an online network can be reached across a computer desktop including in applications and services, without having to customize each application or service. Aspects of the present invention enable one set of presence controls of a person connected to an online network that work for all presence-providing services without the user having to think about which service may be connected.

According to an exemplary embodiment of the present invention, a method of obtaining contact information for a person or an entity is provided, wherein the method comprises: detecting a name of the person or the entity in a frame from a screen of a device; determining a presence status for the detected name based on one or more connectivity status for the detected name in one or more communication applications and/or one or more databases, where the one or more communication applications operate on the device from which the frame originates and where the one or more databases are accessible on the device; and displaying the presence status on the screen of the device.

Aspects of the present invention may enable, for example, detecting a presence of one or more persons or entities in applications running on a device (e.g., a personal computer or a mobile phone) of a user, displayed on a screen of the device. This is done by a client side application, which may run on a computer or mobile phone. In accordance with various embodiments of the invention, the application may run elsewhere and communicate with the user's personal computer or mobile phone via, for example, the Internet. The applications may provide access to one or more online networks having a number of users currently connected thereto. Examples for such network or communication applications may be MSN/Messenger network, AIM/Yahoo, Trillian, Pidgin, Gchat/Google, WhatsApp, Facebook, Skype, Cisco, etc. In these applications, a service is offered to show the presence of persons or entities, which are in the personal contact list of the user. A person or entity who is online can be contacted in various ways by the user including placing a VoIP call and sending an instant message.

In an embodiment, a screen shot of the screen is taken as a frame and the names of all persons on the screen shot are recognized by, for example, text recognition (e.g., Optical Character Recognition, or 'OCR') program and thereafter a Named Entity Recognition (NER) algorithm for finding names is applied. In an exemplary embodiment, a name of a person on the screen may be selected manually by the user. In another exemplary embodiment, the screen shot may be sent to an internet-based OCR and NER service for recognizing the person mentioned on the screen and sending back the detected name(s) to the personal computer or the mobile phone. Alternatively, only one of the previously mentioned steps could be done as an internet-based method, and the other may be performed locally on the personal computer or mobile phone.

In an exemplary embodiment, recognizing presence-providing applications may run on a mobile phone, and may be used in identifying in which of the applications the recognized person is currently connected could advantageously comprise checking a location-based internet service or a web-service for an application. Recognizing at least one name of a person may comprise searching a personal list of names of the user in the computer or a mobile phone or contacting an internet data source. Displaying the presence status on the screen may comprise a presence list, where the presence status of a number of persons may be displayed.

The marking of the recognized name may be done in a number of ways. In one embodiment, a dashed-underline may be put underneath all recognized persons on the screen together with an icon. When the mouse hovers over the name of the person or the icon, the details of the person are displayed. If the coordinates of the name in the picture or screen shot are known and a space is detected next to the name, the presence status may be displayed in the free space. Alternatively, the presence details of recognized names may be overlaid on top of the screen using a transparent window, which does not change or modify the underlying application(s). However, presence information may be, for example, displayed in a corner of the screen. If available, additional information for the person on the presence status can be shown.

In an exemplary embodiment, the presence of the person in the applications indicated in the presence list may be updated continuously or periodically, so that the user may know of any change (e.g., when a person goes offline in an application, changes status or location). The presence status gives the user the possibility to see how a person can be contacted over a respective online network. Especially a VoIP-call can be initiated or an instant message may be sent. In another exemplary embodiment, a second one of the one or more communication applications is selected and a second communication session is initiated if the communication session cannot be established over a first one of the one or more communication applications. Such a selection may be performed according to numerous criteria, including, but not limited to, personal preference, communication quality, or cost.

In an exemplary embodiment, aspects of the invention relate as well to a computer program product comprising a software code of a client side application which can be loaded in a memory of a personal computer or mobile phone, and executed by a processor so as to run, when starting the software code, a method of obtaining contact information for a person or an entity, wherein the method comprises: detecting a name of the person or the entity in a frame from a screen of a device; determining a presence status for the detected name based on one or more connectivity status for the detected name in one or more communication applications and/or one or more databases, where the one or more communication applications operate on the device from which the frame originates and where the one or more databases are accessible on the device; and displaying the presence status on the screen of the device.

FIG. 1 illustrates an exemplary screenshot of a user's device. Referring to FIG. 1, there is shown a screen snapshot (1), which may correspond to a snapshot or any other frame of a screen of a user's device. In this regard, a first step may comprise taking the screen snapshot (1) of the user's device. The user's device may comprise, for example, a personal computer, a mobile phone, or any other device; and may comprise any suitable logic, circuitry, interfaces, and/or code which may be operable to implement various aspects of the present disclosure.

The screen snapshot (1) may comprise, as shown in FIG. 1 for example, a normal text element shown on the screen. As understood, the method(s) described herein may be applicable to any application shown on screen, including, for example, presence applications (e.g., Facebook or Skype). The result may be that the presence of a person or entity in a single application can be checked in other applications running on the personal computer or mobile phone. Some applications may be internet-based e.g., Google or Facebook and the presence of a person or an entity can easily be checked over the Internet. The internet based applications then can easily be included into the presence control.

Normal personal computers have a built-in application to produce such a screenshot or frames. From the frame of the screen text recognition is done. This may be done by any known optical character recognition (e.g., Optical Character Recognition, or OCR) software. When doing OCR of the snapshot, the X/Y coordinates of the text are preserved so presence controls can be rendered in the right locations in the text.

Thereafter, names in the text are found using any known Named Entity Recognition (NER) software. This may involve determining a language of the text first. All online network applications running on the computer or a mobile phone might be identified. Once names and available communication applications are known, in another step it is identified in which application the recognized person is currently connected. Then, a presence status is shown on the screen in which application the recognized person is currently connected. The presence status may give a general overview of, for example, persons, status, location, and/or possibilities to contact the person, for any online network application. The step of displaying this presence status may comprise displaying a presence list, where the presence status of a number of persons which have been detected is displayed.

The OCR and/or the NER steps may be performed locally on a client computer, or, they could be provided via an internet-based service, i.e., meaning the screenshot would be sent over the internet to a server which would do some or all of the OCR and NER tasks and return the results to the computer or mobile phone of the client. Still, it would be possible that only one of OCR and NER may be done locally and the other is done as an internet based service. Alternatively, the user could select manually a name of a person on the screen by the user with his mouse. This selected name is copied to a clipboard, and thereafter the name in the clipboard is looked up. Highlighting and rendering the presence in the found applications may be done as described in relation with FIG. 2, for example.

FIG. 2 illustrates an exemplary screenshot, where different names have been recognized and marked, in accordance with an embodiment of the invention. In this regard, FIG. 2 shows the screen snapshot (1) of FIG. 1, where different names have been recognized and marked. In this exemplary embodiment, the names are underlined and beside the name an icon (2), which may be actionable (e.g., allowing for user input bay interacting therewith), may be displayed and shown in which application the person is present and how he or she can be reached. The client side application may detect if a given contact has limited modalities through which they can be reached. For example, in instances where an application running on the system (e.g., Facebook) may receive instant messages, then if a contact is online, the software may indicate the available communication modalities as instant messages. The presence status of the person can as well be shown when, for example, the mouse (pointer) hovers over one of the names. An example of a contact card, which appears once the user chooses a person, is shown in FIG. 3.

FIG. 3 illustrates an exemplary contact card of a recognized person with the possibility of contacting the person via email, Instant messenger or call. Referring to FIG. 3, there is shown a contact card (3), which may appear when a user chooses a person, as described, for example, with regard to FIG. 2. For example, when the icon (2), of FIG. 2, for a particular person ("Eckard Laurien") has been chosen, the contact card (3) shown in FIG. 3 may be displayed. The contact card (3) may indicate, for example, when the corresponding person is online on particular applications (e.g., Skype and Google), and/or may also comprise contact icons (4), which may indicate the means by which the person may be reached (e.g., Email, Instant Messaging or IM, and/or a VoIP call). The user can directly click on one of the icons to contact directly the person. In the embodiment of FIGS. 2 and 3, the presence control process may be overlaid on the text parts of the screen or on the running applications without modifying the state of the applications. Alternatively, a space can be detected next to a recognized name and showing the presence there. Of course, any additional information for the person can be shown on the presence list.

In some instances, if the coordinates (e.g., X/Y) of a screen shot are unavailable, a small window of contacts (e.g., contact lists) may be shown somewhere on the screen, e.g., in a corner. An example of such a contact lists is shown in FIG. 4.

FIG. 4 illustrates an exemplary list of all recognized names on the user's screen, including the presence in online networks applications. Referring to FIG. 4, there is shown a contact lists (5). In this regard, the contact lists (5) may be utilized in instances where, for example, the (X/Y) coordinates of a screen shot maybe unavailable, thus necessitating use of other means to display contacts related information—e.g., a small window of contacts may be shown somewhere on the screen, e.g., in a corner. The contact lists (5) may display, for each recognized contact, the communication application(s) by which the contact may be online and the contact icon(s) (4) indicating one or more modes of reaching the contact.

Both the contact card (3) of FIG. 3 and the contact lists (5) of FIG. 4, once shown on the screen (of user's device), may be continuously or periodically updated, for example, as the presence of the person in the applications might change over time. Therefore, it is possible that if a person is not contactable in a way through a specific application, although shown in the list, the client side application automatically chooses a different application, to which the recognized person is currently connected. This process may be transparent to the user.

Additionally or alternatively, if Named Entity Recognition (NER) does not work, an alternative search may be performed—e.g., using text recognition (OCR) program for names against a personal list of names of the user stored in the computer or a mobile phone.

Alternatively, the names recognition may comprise contacting an internet page or internet data source, such as a telephone book or any other register, where names may be found. FIG. 5 shows an example of contact list with information from an Internet page.

FIG. 5 illustrates an exemplary contact card of a recognized person, where different persons with the same name have been found on the Internet. Referring to FIG. 5, there is shown a contact list (6) with information from an Internet page XY. In this case, as different options are available, these options may include found telephone numbers being shown, such as when clicking on or hovering over the name or icon (2) in FIG. 2 for example.

Furthermore, there are location-based internet services like FourSquare that allow people to "check in" on the internet, which makes their location known. In the framework of the invention, such location-based internet services could be used to show that the person is online, available, checked into Desperados Restaurant 9 minutes ago, for example. Lync (Microsoft Communicator) has as well automatic location services built in, which could be used. A graphical aid could be used, for example, the closer someone is to the location of the user, and then the larger the presence icon would become, so at a glance the user could see who is geographically close to them.

Furthermore, it could be possible that an online calendar of a recognized person is used to show what a person is doing at the moment (e.g., "available, online, has meeting ABCD in 10 minutes"). A graphical aid could be used, e.g., contacts that are about to become unavailable because they have a meeting soon could have their name in italics, or have a partially faded presence icon, etc.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

In accordance with various embodiments of the invention, the user may start the client side application and any related step of the inventive method by pressing a key or a combination of keys of a keyboard of the personal computer or mobile phone. In an exemplary embodiment, aspects of the invention relate also to a computer program product comprising a software code of a client side application which can be loaded in a memory of a personal computer or mobile phone, and executed by a processor so as to run the steps of any of the inventive claims. In an exemplary embodiment, aspects of the invention relate as well to a computer program product comprising a software code of a client side application which can be loaded in the memory of a personal computer or mobile phone, and executed by a processor so as to run the steps of any of the claims. The following three examples are given as example, non-limiting embodiments.

Example 1

Calling from Facebook.

User is connected to Facebook, and sees from a status update that a friend is back from vacation. User uses aspects of the disclosure to see the presence of the contact in available communication applications. User interacts with the control to place a call over the online network that the friend is logged into, for example.

Example 2

Chatting with WhatsApp Users from Skype.

User has Skype open on their computer, wants to chat with a friend, but the friend is offline in Skype. So user uses aspects of the disclosure to determine the presence of the contact, and sees they are online in WhatsApp. User interacts with the presence control and starts an Instant Message IM conversation over WhatsApp.

Example 3

Internet Page Integration.

User viewing a PDF, sees a name and wants to call that person. User uses aspects of the disclosure to determine the presence of the contact. User interacts with the control and sees that although the contact is not on the user's buddy list, the contact details were found on an internet page. User uses the control to place a call.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in an electronic device:
      detecting an indication of a particular person or a particular entity in an output of said electronic device;
      determining status information associated with said particular person or said particular entity, wherein:
         said status information comprises an indication of accessibility of said particular person or said particular entity; and
         said status information is determined based on information associated with said particular person or said particular entity in one or more applications and/or one or more databases;
      providing said status information to a user via said electronic device; and
      based on user input that is responsive to providing said status information, performing one or more actions relating to said particular person or said particular entity.

2. The method of claim 1, wherein said one or more actions comprise initiating in response to said user input and based on said status information, a communication session, to provide connectivity with said particular person or said particular entity.

3. The method of claim 1, wherein said output of said electronic device comprises visual output via a screen of said electronic device.

4. The method of claim 3, wherein said visual output via said screen comprises text selected by a user of said electronic device.

5. The method of claim 1, comprising offloading at least part of said detecting of said indication of said particular person or said particular entity and/or said determining of said status information to another electronic device or an internet based service.

6. The method of claim 1, comprising determining said status information based on location-based internet service data and/or a web-service associated with at least one of said one or more applications.

7. The method of claim 1, comprising providing said indication of said particular person or said particular entity to said user of said electronic device.

8. The method of claim 7, comprising providing said status information based on a user action in response to said providing of said indication of said particular person or said particular entity.

9. The method of claim 1, comprising initiating said detecting of said indication of said particular person or said particular entity in response to user input.

10. An electronic device comprising:
    an output component;
    an input component; and
    one or more circuits operable to:
       detect an indication of a particular person or a particular entity in an output of said electronic device;

determine status information associated with said particular person or said particular entity, wherein:
  said status information comprises an indication of accessibility of said particular person or said particular entity; and
  said one or more circuits determine said status information based on information associated with said particular person or said particular entity in one or more applications and/or one or more databases;
provide said status information to a user of said electronic device via said output component; and
based on user input received via said input component, that is responsive to providing said status information, perform one or more actions relating to said particular person or said particular entity.

11. The electronic device of claim 10, wherein said one or more actions comprise initiating in response to said user input and based on said status information, a communication session, to provide connectivity with said particular person or said particular entity.

12. The electronic device of claim 10, wherein said output component comprises a screen or display, and said output of said electronic device comprises visual output.

13. The electronic device of claim 12, wherein said visual output comprises text selected by a user of said electronic device.

14. The electronic device of claim 10, wherein said one or more circuits are operable to offload at least part of said detecting of said indication of said particular person or said particular entity and/or said determining of said status information to another electronic device or an internet based service.

15. The electronic device of claim 10, wherein said one or more circuits are operable to determine said status information based on location-based internet service data and/or a web-service associated with at least one of said one or more applications.

16. The electronic device of claim 10, wherein said one or more circuits are operable to provide said indication of said particular person or said particular entity to said user of said electronic device.

17. The electronic device of claim 16, wherein said one or more circuits are operable to provide said status information based on a user action in response to said providing of said indication of said particular person or said particular entity.

18. The electronic device of claim 10, wherein said one or more circuits are operable to initiate said detecting of said indication of said particular person or said particular entity in response to user input.

\* \* \* \* \*